US012671906B2

(12) United States Patent
Iqbal et al.

(10) Patent No.: US 12,671,906 B2
(45) Date of Patent: Jun. 30, 2026

(54) SYSTEMS AND METHODS FOR DETECTION AND MITIGATION OF A ROLLING BAND USING A SECONDARY CAMERA

(71) Applicant: Google LLC, Mountain View, CA (US)

(72) Inventors: Gazi Yamin Iqbal, Mountain View, CA (US); Hung-Hsin Wu, San Diego, CA (US)

(73) Assignee: Google LLC, Mountain View, CA (US)

( * ) Notice: Subject to any disclaimer, the term of this patent is extended or adjusted under 35 U.S.C. 154(b) by 165 days.

(21) Appl. No.: 18/615,186

(22) Filed: Mar. 25, 2024

(65) Prior Publication Data

US 2025/0301228 A1      Sep. 25, 2025

(51) Int. Cl.
| | |
|---|---|
| *H04N 23/73* | (2023.01) |
| *G06T 7/00* | (2017.01) |
| *H04N 23/71* | (2023.01) |
| *H04N 23/745* | (2023.01) |

(52) U.S. Cl.
CPC ........... *H04N 23/73* (2023.01); *G06T 7/0002* (2013.01); *H04N 23/71* (2023.01); *H04N 23/745* (2023.01); *G06T 2207/10016* (2013.01); *G06T 2207/30168* (2013.01)

(58) Field of Classification Search
CPC ...... H04N 23/73; H04N 23/71; H04N 23/745; H04N 23/45; H04N 23/57; H04N 23/81; H04N 23/90; G06T 7/0002; G06T 2207/10016; G06T 2207/30168; H04M 2250/52; H04M 1/72454
See application file for complete search history.

(56) References Cited

U.S. PATENT DOCUMENTS

| | | |
|---|---|---|
| 2018/0241928 A1 | 8/2018 | Chen et al. |
| 2020/0053273 A1 | 2/2020 | Kim et al. |
| 2023/0209210 A1 | 6/2023 | Wang et al. |

FOREIGN PATENT DOCUMENTS

| | | |
|---|---|---|
| CN | 117692761 B | 2/2025 |
| EP | 2760208 B1 | 4/2019 |
| WO | 2023001373 A1 | 1/2023 |
| WO | 2024055290 A1 | 3/2024 |

OTHER PUBLICATIONS

CN 117692761 A translation (Year: 2024).*
"OV7670/0V7171 CMOS VGA (640×480) CameraChip Implementation Guide," OmniVision, Sep. 2, 2005, Document Version 1.0, 64 pages.
International Searching Authority, International Search Report and Written Opinion mailed on Jun. 3, 2025, issued in connection with International Patent Application No. PCT/US2025/020520 filed Mar. 19, 2025, 15 pages.

* cited by examiner

*Primary Examiner* — Sinh Tran
*Assistant Examiner* — Angel L Garces-Rivera
(74) *Attorney, Agent, or Firm* — McDonnell Boehnen Hulbert & Berghoff LLP

(57) ABSTRACT

An example method includes displaying, by a viewfinder, a preview of a video of a scene being captured by a primary camera. The method also includes receiving, from an image sensor of a secondary camera, pixel data corresponding to the scene, wherein the primary camera and the secondary camera share a common field of view. The method additionally includes determining, based on the pixel data from the secondary camera, a presence or an absence of a rolling band in the preview of the video being captured by the primary camera.

21 Claims, 7 Drawing Sheets

700

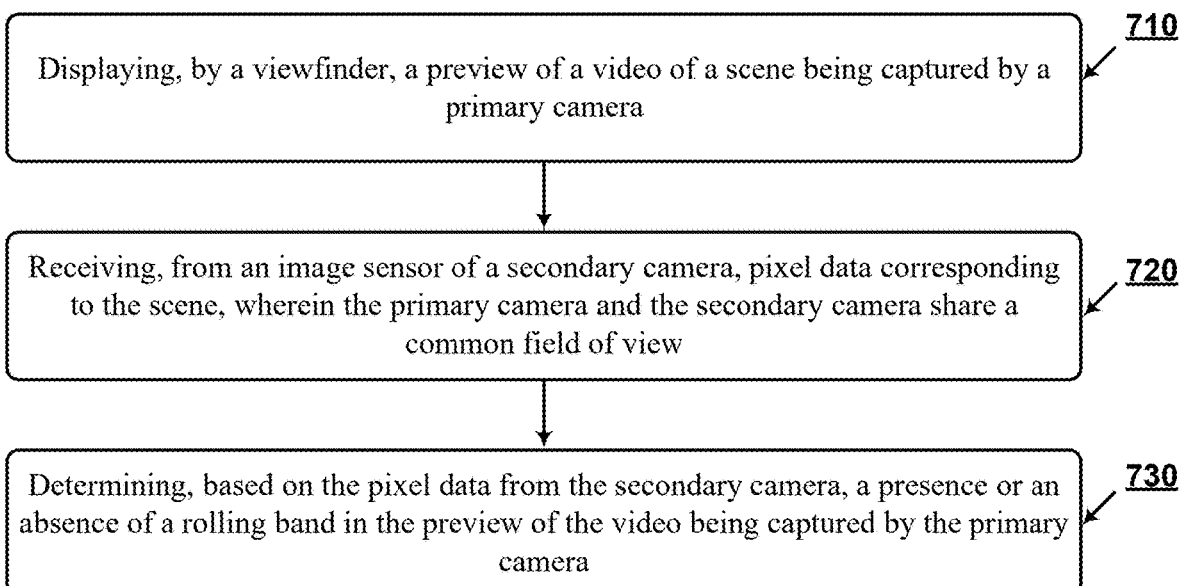

710

Displaying, by a viewfinder, a preview of a video of a scene being captured by a primary camera

720

Receiving, from an image sensor of a secondary camera, pixel data corresponding to the scene, wherein the primary camera and the secondary camera share a common field of view

730

Determining, based on the pixel data from the secondary camera, a presence or an absence of a rolling band in the preview of the video being captured by the primary camera

Figure 7

SYSTEMS AND METHODS FOR DETECTION AND MITIGATION OF A ROLLING BAND USING A SECONDARY CAMERA

BACKGROUND

Many modern computing devices, including mobile phones, personal computers, and tablets, include image capture devices, such as still and/or video cameras. The image capture devices can capture images, such as images that include people, animals, landscapes, and/or objects. The image capture devices can include an image sensor. The image sensor includes a plurality of light-sensing pixels that measure an intensity of light incident thereon and thereby collectively capture an image of an environment. The intensity of light may have a high dynamic range based on the environment.

SUMMARY

This application generally relates to detecting and correcting rolling bands in live capture videos. A rolling band can occur when recording a video on a smartphone. It is generally caused by a mismatch between the frame rate of the video and the frequency of the ambient lighting that is being used. This can result in horizontal lines or bands that appear to be moving across the video. Existing technologies determine that there is a rolling band, and then increase the exposure time of the camera to remove and/or reduce the banding. However this can reduce dynamic range (e.g., in indoor bright scenes), and users will likely see the bright areas of the image as over exposed. Also, detection of banding based on row sums alone may be unreliable. For example, the changes in row sums may be caused by a moving object. However, a frequency of the banding can be compared to a frequency of the ambient light to eliminate a false detection of banding, such as the one caused by motion. Some advanced devices (e.g., smartphones) may be equipped with a flicker sensor that detects an ambient flicker, and/or an ambient light sensor (ALS) that detects an amount of ambient light. However, an ALS may be defective, thereby resulting in poor image quality. Also, many devices may not have an ALS. In the event the device is configured with an ALS to measure a brightness of ambient light, the exposure time for the ALS is generally long (e.g., 250 ms). In the event the device is configured with a flicker sensor to measure a change in brightness levels due to a flickering light source, the exposure time for the flicker sensor may be short (e.g., less than 1 ms). In some devices, the operations of an ALS and a flicker sensor may be performed by one sensor. For example, the ALS sensor and the flicker sensor may be running on the same hardware, but with different exposure time settings.

In one aspect, a computer-implemented method is provided. The method includes displaying, by a viewfinder, a preview of a video of a scene being captured by a primary camera. The method also includes receiving, from an image sensor of a secondary camera, pixel data corresponding to the scene, wherein the primary camera and the secondary camera share a common field of view. The method additionally includes determining, based on the pixel data from the secondary camera, a presence or an absence of a rolling band in the preview of the video being captured by the primary camera.

In another aspect, a system is provided. The system may include one or more processors. The system may also include data storage, where the data storage has stored thereon computer-executable instructions that, when executed by the one or more processors, cause the system to carry out operations. The operations may include displaying, by a viewfinder, a preview of a video of a scene being captured by a primary camera. The operations may also include receiving, from an image sensor of a secondary camera, pixel data corresponding to the scene, wherein the primary camera and the secondary camera share a common field of view. The operations may further include determining, based on the pixel data from the secondary camera, a presence or an absence of a rolling band in the preview of the video being captured by the primary camera.

In another aspect, a computing device is provided. The device includes a primary camera and a secondary camera that share a common field of view. The device also includes one or more processors and data storage that has stored thereon computer-executable instructions that, when executed by the one or more processors, cause the computing device to carry out operations. The operations may include displaying, by a viewfinder of the computing device, a preview of a video of a scene being captured by the primary camera. The operations may also include receiving, from an image sensor of the secondary camera, pixel data corresponding to the scene. The operations may further include determining, based on the pixel data from the secondary camera, a presence or an absence of a rolling band in the preview of the video being captured by the primary camera.

In another aspect, an article of manufacture is provided. The article of manufacture may include a non-transitory computer-readable medium having stored thereon program instructions that, upon execution by one or more processors of a computing device, cause the computing device to carry out operations. The operations may include displaying, by a viewfinder, a preview of a video of a scene being captured by a primary camera. The operations may also include receiving, from an image sensor of a secondary camera, pixel data corresponding to the scene, wherein the primary camera and the secondary camera share a common field of view. The operations may further include determining, based on the pixel data from the secondary camera, a presence or an absence of a rolling band in the preview of the video being captured by the primary camera.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 7 is a flowchart of a method, in accordance with example embodiments.

DETAILED DESCRIPTION

Figure 1:
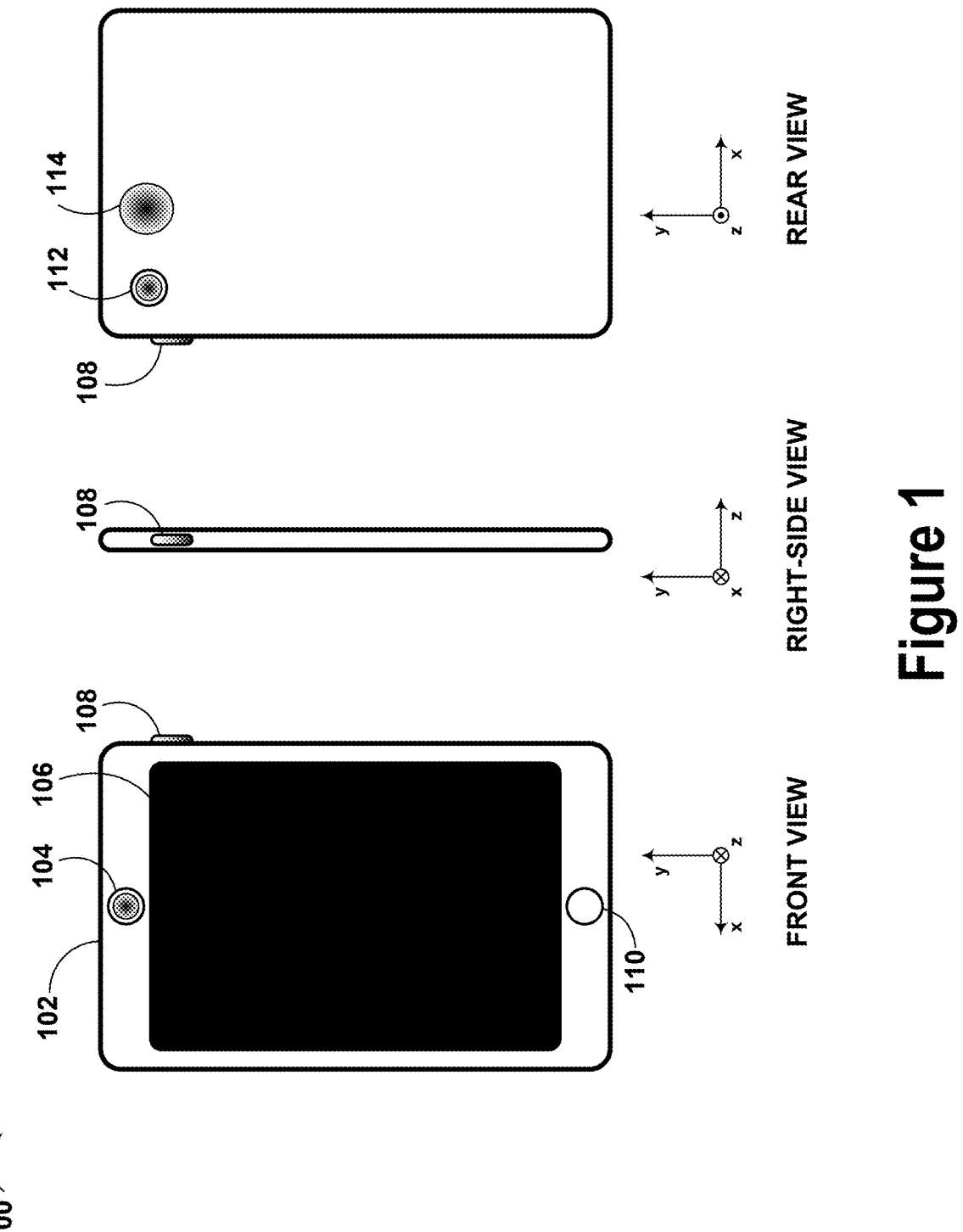
FIG. 1 is an illustration of front, right-side, and rear views of a digital camera device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Overview

Anti-banding features in phone cameras require a knowledge of the active utility/power-line frequency, which can be accurately and reliably calculated through a time series data obtained from an ambient light sensor (ALS). Generally, the ALS is capable of sampling the intensity of ambient light at an extremely high rate. However, some devices may not be equipped with such a sensor. Accordingly, image-based methods may be used in order to obtain the utility frequency. Existing image based utility frequency detection systems utilize imagery captured from the primary camera that is currently in active use (e.g., used for preview and direct capture of image data). In such situations, the exposure time and gain set to the primary camera may need to be additionally configured to ensure that banding is not visible at the viewfinder in order to display an acceptable photo preview quality and acceptable photo result in a zero shutter lag system. Some other approaches involve using images from the primary and secondary cameras to determine a delta difference between the respective image data.

A single camera approach, or a dual camera with comparison approach, both suffer from significant disadvantages. For example, the exposure time and gain must prioritize an acceptable preview of the image from the primary camera, rather than a successful detection of banding and utility frequency. These two goals may generally be in conflict with each other. For example, a successful detection of utility frequency is generally possible when banding is prominently visible at the camera. However, prominent banding may not be a desired end result for image capture purposes. Also, for example, when the utility frequency is being detected as a result of banding artifacts in the image captured from the primary camera, once a corrective exposure time is set, the banding artifacts may no longer be visible. Accordingly, a light source causing the banding artifacts may no longer be discernible to the camera, thereby resulting in an image that has not been corrected for banding. As such, it may be challenging to determine whether a restriction on exposure time to prevent banding artifacts may be removed. One approach may involve a momentary release of the restriction on exposure time, and checking if the banding is detected again. However, this is likely to result in a degraded user experience. Also, for example, using delta comparisons between image data from dual cameras can result in higher compute resources.

In a dual camera system, typically one of the cameras is actively streaming (referred to as a primary camera), while the other camera is passively streaming (referred to as a secondary camera). The images from the primary camera may be displayed as a preview image in a viewfinder. However, the secondary camera image may be used to aid the exposure decisions and image quality from the primary camera. The secondary cameras also are not subject to strict restrictions to satisfy an acceptable preview quality, and therefore can be set to such a lower exposure time and gain to prioritize banding artifact detection. Generally, sacrificing the image quality of the primary camera is not a preferable option, but there can be a lot more freedom with images from the secondary camera.

Detection of a rolling band involves determining the row sums of pixel intensities in successive frames of a video. The row-wise change in pixel intensities can be used to detect whether or not there is banding. For example, a sinusoidal curve can indicate banding, whereas a substantially linear function can indicate an absence of banding. Also, for example, a frequency of the banding, if present, can be determined from the sinusoidal curve. Image data from the secondary camera can be used both to detect banding and to determine a frequency of flickering. The frequency of the flickering and the frequency of the banding may be compared to determine an amount of banding, and whether mitigation is needed to resolve a visible banding.

The severity of the banding observed has an inverse relationship with the exposure time. Bands may be barely visible in the viewfinder at an exposure time close enough to the particular amount required to cancel bands. At a lower exposure time (e.g. ~$2/3$ ms exposure time), the banding within the flicker statistics may become more pronounced, and this can greatly facilitate the task of detecting rolling bands. When the ambient brightness level remains the same, an average of luminance values in an image will remain the same. However, in the presence of flickering, i.e. when a frequency of the ambient brightness level changes, the period of the sinusoidal curve changes.

As described herein, the secondary camera can be run at a low exposure time (e.g., at or below 3 ms), and banding may be directly detected from the image data. Such an approach eliminates a need to compromise and/or adjust the primary camera's exposure times for a few frames just for the purpose of detecting flickering light sources. The lower exposure time in the secondary camera also facilitates detection of flicker/banding.

Some approaches rely on obtaining images from the primary and secondary cameras and determining delta differences between the images. For example, the image capturing device may capture multiple images of a scene using different exposure times. Frequency analysis may be performed on the differences between the captured images to automatically detect flicker. Based on the detected flicker, the image capturing device may adjust the exposure time to capture subsequent images. However, as described in the approach herein, there is generally no need for the primary camera to be involved in flicker detection. The secondary camera may be generally set at a low exposure time (e.g. appx. 2 ms) to capture the banding. This eliminates the need for multiple images at different exposure times, and also keeps the preview image free from changes due to ongoing flicker measurement and/or adjustment.

Once it is determined, based on the secondary camera, that the rolling band is significant and/or visible enough to be mitigated, techniques for removal/reduction of the rolling band are applied to the primary camera. The secondary camera can continue to monitor the ambient light (e.g., at regular intervals of time, or by detecting a change in the determined ambient light frequency), and adjust the primary camera settings as needed. Thus, a user viewing the preview from the primary camera does not see the banding, and the preview image quality can be of a superior quality that can be captured by the primary camera.

Devices that are equipped with an ALS may determine the ambient light frequency using the ALS data as well. In such situations, the ALS data and the image data from the secondary camera may be compared to determine a confidence level of the measurements. Generally, the secondary camera may have a wider field of view than the primary camera, and may therefore be able to detect the light sources contributing to the ambient light brightness of the preview from the primary camera. Accordingly, in the event there is a discrepancy between the measurements of the ALS data and the image data from the secondary camera, the image data from the secondary camera may be given preference and relied upon. Also, in such instances, a notification may be generated that indicates a possible error with the ALS.

Example Camera Systems

As image capture devices, such as cameras, become more popular, they may be employed as standalone hardware devices or integrated into various other types of devices. For instance, still and video cameras are now regularly included in wireless computing devices (e.g., mobile devices, such as mobile phones), tablet computers, laptop computers, video game interfaces, home automation devices, and even automobiles and other types of vehicles.

The physical components of a camera may include one or more apertures through which light enters, one or more recording surfaces for capturing the images represented by the light, and lenses positioned in front of each aperture to focus at least part of the image on the recording surface(s). The apertures may be of a fixed size or may be adjustable. In an analog camera, the recording surface may be a photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

One or more shutters may be coupled to, or positioned near, the lenses or the recording surfaces. Each shutter may either be in a closed position, in which it blocks light from reaching the recording surface, or an open position, in which light is allowed to reach the recording surface. The position of each shutter may be controlled by a shutter button. For instance, a shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened," the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "capture" may refer to any mechanical and/or electronic shuttering process that results in one or more images being recorded, regardless of how the shuttering process is triggered or controlled.

The exposure of a captured image may be determined by a combination of the size of the aperture, the brightness of the light entering the aperture, and the length of the shutter cycle (also referred to as the shutter length, the exposure length, or the exposure time). Additionally, a digital and/or analog gain (e.g., based on an ISO setting) may be applied to the image, thereby influencing the exposure. In some embodiments, the term "exposure length," "exposure time," or "exposure time interval" may refer to the shutter length multiplied by the gain for a particular aperture size. Thus, these terms may be used somewhat interchangeably, and should be interpreted as possibly being a shutter length, an exposure time, and/or any other metric that controls the amount of signal response that results from light reaching the recording surface.

In some implementations or modes of operation, a camera may capture one or more still images each time image capture is triggered. In other implementations or modes of operation, a camera may capture a video image by continuously capturing images at a particular rate (e.g., 24 frames per second) as long as image capture remains triggered (e.g., while the shutter button is held down). Some cameras, when operating in a mode to capture a still image, may open the shutter when the camera device or application is activated, and the shutter may remain in this position until the camera device or application is deactivated. While the shutter is open, the camera device or application may capture and display a representation of a scene on a viewfinder (sometimes referred to as displaying a "preview frame"). When image capture is triggered, one or more distinct payload images of the current scene may be captured.

Cameras, including digital and analog cameras, may include software to control one or more camera functions and/or settings, such as aperture size, exposure time, gain, and so on. Additionally, some cameras may include software that digitally processes images during or after image capture. While the description above refers to cameras in general, it may be particularly relevant to digital cameras. Digital cameras may be standalone devices (e.g., a DSLR camera) or may be integrated with other devices.

Either or both of a front-facing camera and a rear-facing camera may include or be associated with an ALS that may continuously or from time to time determine the ambient brightness of a scene that the camera can capture. In some devices, the ALS can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure time of an associated camera, or to help in this determination.

FIG. 1 is an illustration of front, right-side, and rear views of a digital camera device 100, in accordance with example embodiments. Digital camera device 100 may be, for example, a mobile device (e.g., a mobile phone), a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include one or more rear-facing cameras 112, 114. Front-facing camera 104 may be positioned on a side of body 102 typically facing a user while in operation, or on the same side as multi-element display 106. Rear-facing cameras 112, 114 may be positioned on a side of body 102 opposite front-facing camera 104. Referring to the cameras as front-facing and rear-facing is arbitrary, and digital camera device 100 may include multiple cameras positioned on various sides of body 102.

Multi-element display 106 could represent a cathode ray tube (CRT) display, a light-emitting diode (LED) display, a liquid crystal display (LCD), a plasma display, or any other type of display known in the art. In some embodiments, multi-element display 106 may display a digital representation of the current image being captured by front-facing camera 104 and/or rear-facing cameras 112, 114, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Multi-element display 106 may include additional features related to a camera application. For example, multiple modes may be available for a user, including, a motion mode, portrait mode, video mode, video bokeh mode, and so forth. The camera application may be in camera mode and provide additional features, such as a reverse icon to activate reverse camera view, a trigger button to capture a previewed image, and a photo stream icon to access a database of captured images. Also for example, a magnification ratio slider may be displayed and a user can move a virtual object along the magnification ratio slider to select a magnification ratio. In some embodiments, a user may use the multi-element display 106, also referred to herein as the display screen, to adjust the magnification ratio (e.g., by moving two fingers on display screen in an outward motion away from each other), and magnification ratio slider may automatically display the magnification ratio.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing cameras 112, 114 may be similarly or differently arranged. Additionally, front-facing camera 104, rear-facing cameras 112, 114, or both, may be an array of one or more cameras.

Either or both of front-facing camera 104 and rear-facing cameras 112, 114 may include or be associated with an illumination component that provides a light field to illuminate a target object. For instance, an illumination component could provide flash or constant illumination of the target object (e.g., using one or more LEDs). An illumination component could also be configured to provide a light field that includes one or more of structured light, polarized light, and light with specific spectral content. Other types of light fields known and used to recover three-dimensional (3D) models from an object are possible within the context of the embodiments herein.

In some digital camera devices 100, either or both of front-facing camera 104 and rear-facing cameras 112, 114 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure time of an associated camera, or to help in this determination.

Digital camera device 100 could be configured to use multi-element display 106 and either front-facing camera 104 or rear-facing cameras 112, 114 to capture images of a target object (e.g., a subject within a scene). The captured images could be a plurality of still images or a video image (e.g., a series of still images captured in rapid succession with or without accompanying audio captured by a microphone). The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100 (or another type of digital camera) may be integrated into a computing device, such as a wireless computing device, cell phone, tablet computer, laptop computer, and so on. For example, a camera controller may be integrated with the digital camera device 100 to control one or more functions of the digital camera device 100.

Rolling Band Detection and Correction

Figure 2:
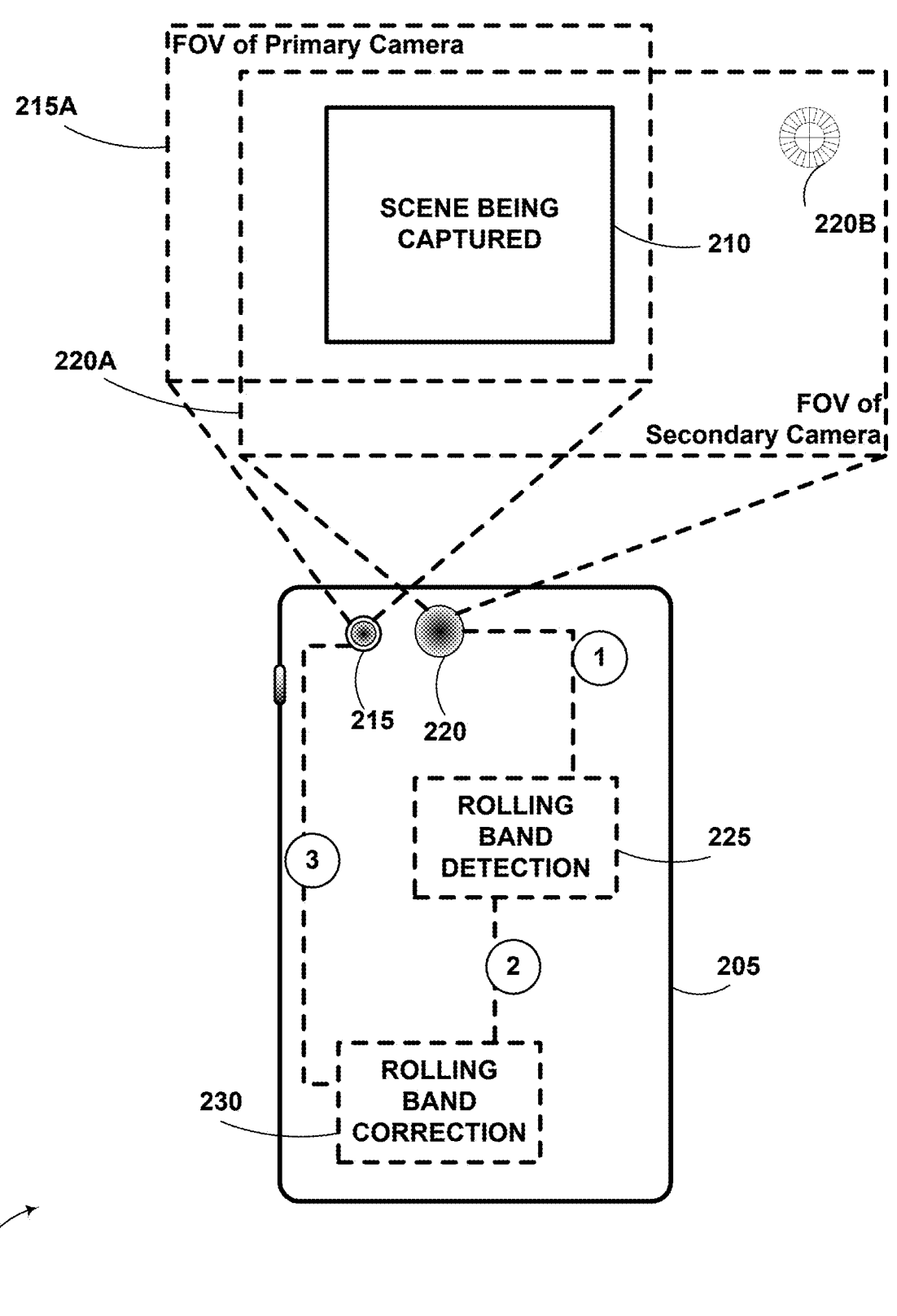
FIG. 2 is an example illustration of rolling band detection and correction, in accordance with example embodiments.

FIG. 2 is an example illustration of rolling band detection and correction, in accordance with example embodiments. In a dual camera system, one of the cameras (referred to herein as a primary camera) may be configured to be actively streaming, while the other camera (referred to herein as a secondary camera) may be configured to be passively streaming. As described herein, images from the secondary camera may be used to adjust the exposure settings and image quality settings for the primary camera. The image from the primary camera may be displayed as a preview. Accordingly, image quality degradation in the image of the primary camera is not desirable as it diminishes user experience and may diminish the quality of a captured image. However, images from the secondary camera may not be displayed to the user, and may therefore be used to detect rolling bands and apply adjustments to the settings of the primary camera.

A computing device 205 is shown with a primary camera 215 and a secondary camera 220. Primary camera 215 may be capturing a video of a scene 210, and secondary camera 220 may be used for detection of rolling bands. A preview of the video of the scene 210 being captured by primary camera 215 may be displayed by a viewfinder of computing device 205. Generally, secondary camera 220 may be viewing the same scene (e.g., scene 210) as that being captured by primary camera 215. For example, primary camera 215 and secondary camera 220 may share a common field of view. As illustrated, primary camera 215 may be associated with a primary field of view 215A, and secondary camera 220 may be associated with a secondary field of view 220A. A shared common field of view may then correspond to an intersection of primary field of view 215A and secondary field of view 220A. Shared scene 210 may be included within the intersection of primary field of view 215A and secondary field of view 220A.

A light source 220B is shown to be within the secondary field of view 220A, but outside the primary field of view 215A. Generally, light source 220B may illuminate scene 210 and cause rolling bands. In some embodiments, the secondary field of view 220A may be wider than the primary field of view 215A. This can enable secondary camera 220 to detect ambient light sources (e.g., light source 220B) that may be present in the secondary field of view 220A, but may not be within the primary field of view 215A.

In some embodiments, secondary camera 220 may be generally set at a low exposure time (e.g., appx. 2 ms) to capture rolling bands. This eliminates the need for multiple images at different exposure times, and also keeps the preview image in primary camera 215 free from changes due to ongoing flicker measurement and/or adjustment.

At step 1, a rolling band detection component 225 of computing device 205 may be configured to receive, from an image sensor of secondary camera 220, pixel data corresponding to scene 210. The term "pixel data" as used herein generally refers to light intensity data from the image sensor. In some embodiments, the pixel data may be an aggregated light intensity data (e.g., a row sum of light intensities for rows in a pixel array, a row-wise average of light intensities, and other such statistical measurements).

In some embodiments, rolling band detection component 225 may be configured to determine, based on the pixel data from secondary camera 220, a presence or an absence of a rolling band in the preview of the video being captured by primary camera 215.

At step 2, upon a determination of a presence of a rolling band in the preview of the video, a rolling band correction component 230 of computing device 205 may be configured to adjust an exposure time for primary camera 215 to reduce the rolling band in the preview of the video.

At step 3, the adjusted parameters for the exposure time may be transmitted to primary camera 215 to reduce and/or eliminate a rolling band in future captured frames of the video.

Rolling Band Detection

The severity of a banding observed generally has an inverse relationship with the exposure time. Also, at exposure times close to a particular threshold value that may be significant for band correction, bands may be barely visible in the viewfinder. This may occur, for example, at exposure times around ~7.5 milliseconds (ms) in 120 Hz lighting. Generally speaking, the flicker statistics (e.g., from a single frame) under such conditions may be hard to distinguish from non-banding scenarios. This can also occur when banding is reasonably visible (e.g., at a 6 ms exposure time in 120 Hz lighting).

Figure 3:
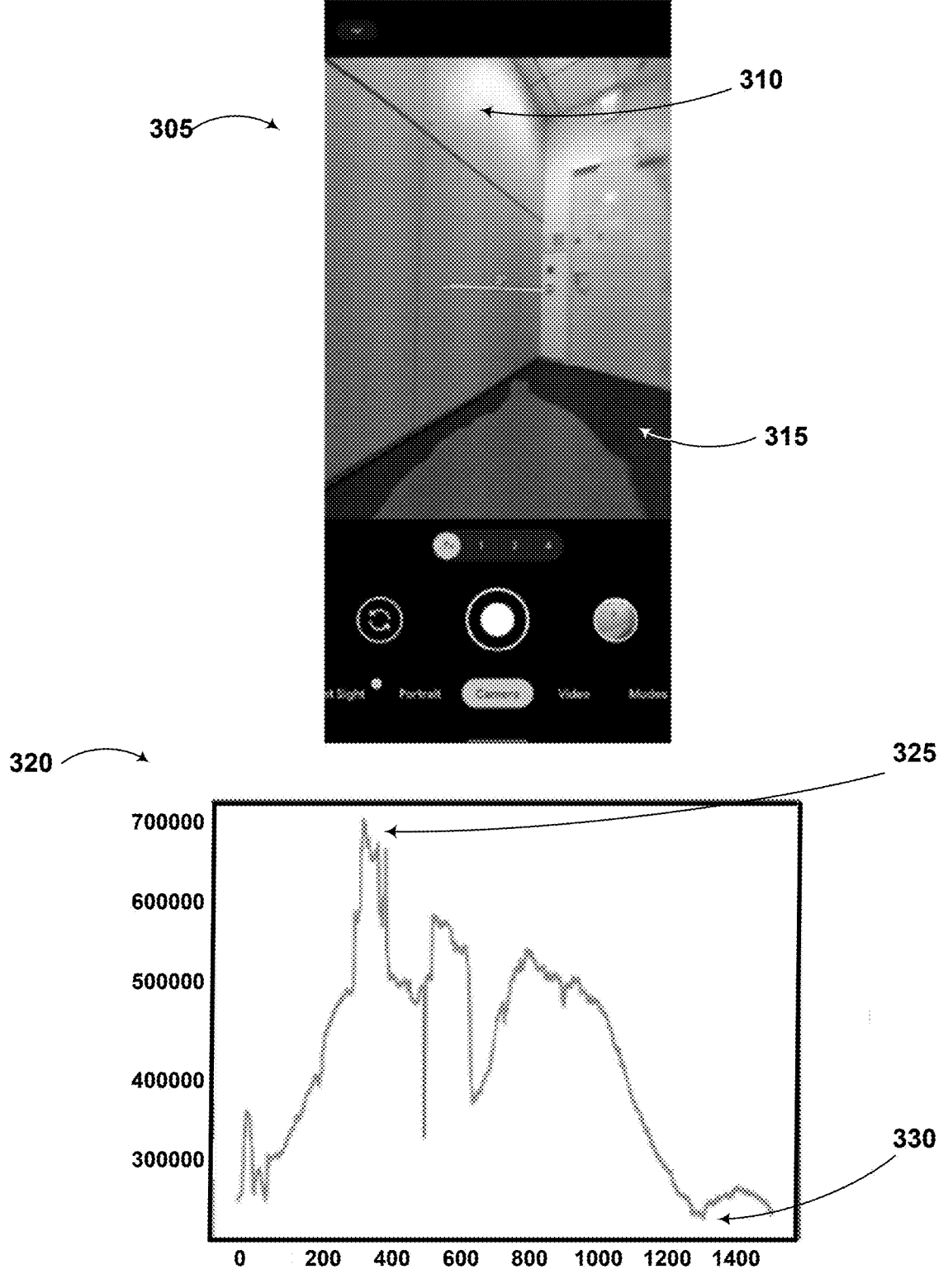
FIG. 3 is an example illustration of rolling band detection, in accordance with example embodiments.

FIG. 3 is an example illustration of rolling band detection, in accordance with example embodiments. A screenshot of a preview 305 is shown with an example bright portion 310 and an example dark portion 315. The preview 305 may correspond to an exposure time setting of 7 ms. A graphical representation 320 illustrates a relationship between brightness values (with values displayed along the vertical axis) and a location in preview 305 (with values displayed along the horizontal axis). A peak 325 indicating a high brightness value may correspond to the example bright portion 310 in preview 305. Likewise, a trough 330 indicating a low brightness value may correspond to the example dark portion 315 in preview 305. A rolling band may be detected based on an appearance of a number of peaks and troughs in a graphical illustration of brightness values of a scene.

Figure 4:
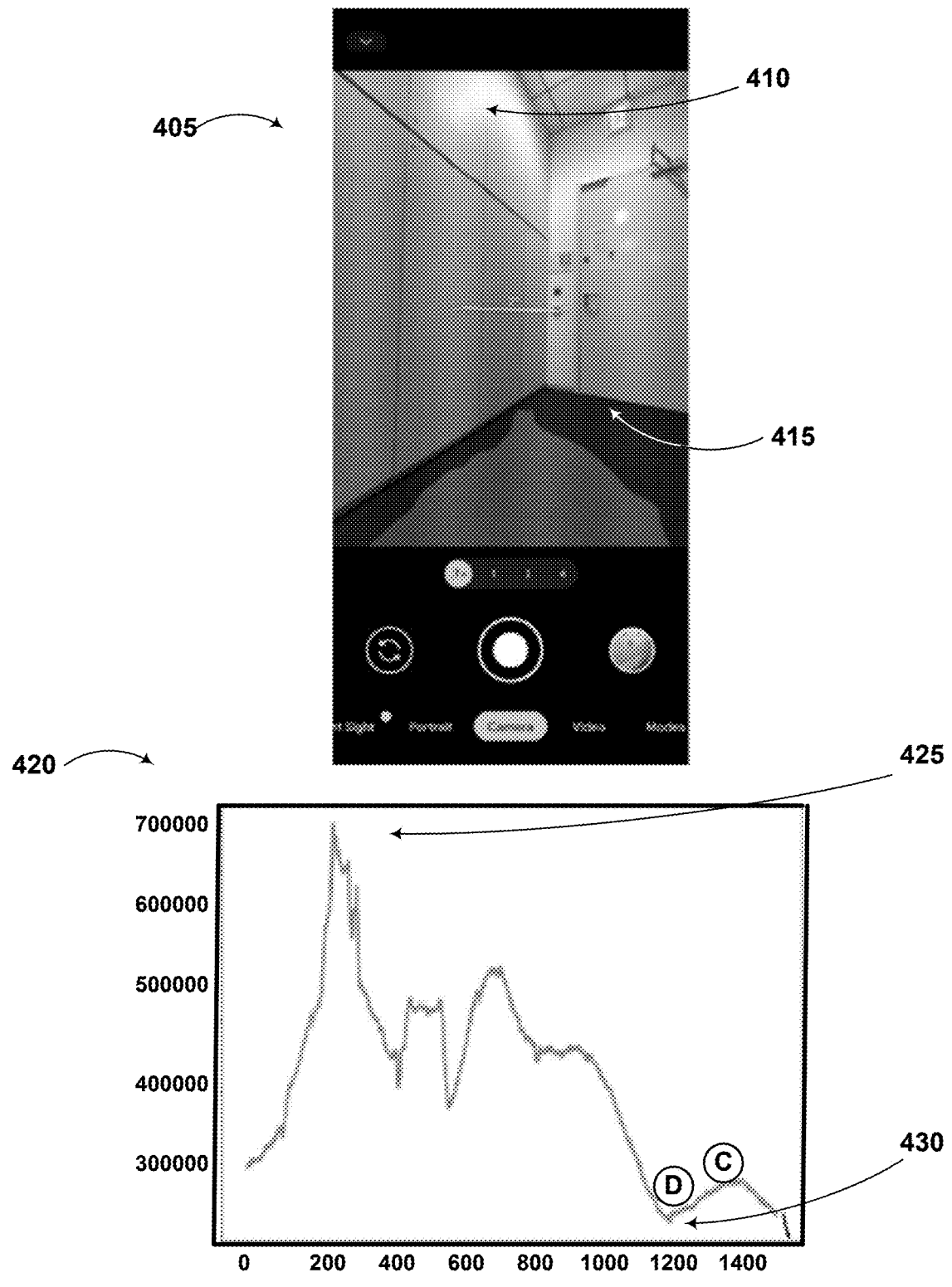
FIG. 4 is another example illustration of rolling band detection, in accordance with example embodiments.

FIG. 4 is another example illustration of rolling band detection, in accordance with example embodiments. A screenshot of a preview 405 is shown with an example bright portion 410 and an example dark portion 415. The preview 405 may correspond to an exposure time setting of 6 ms. A graphical representation 420 illustrates a relationship between brightness values (with values displayed along the vertical axis) and a location in preview 405 (with values displayed along the horizontal axis). A peak 425 indicating a high brightness value may correspond to the example bright portion 410 in preview 405. Likewise, a trough 430 indicating a low brightness value may correspond to the example dark portion 415 in preview 405. A rolling band may be detected based on an appearance of a number of peaks and troughs in a graphical illustration of brightness values of a scene.

Banding may be more detectable at lower exposure time settings (e.g., 2-3 ms). However, these settings, while suitable for band detection, may not be optimal for image capture. Accordingly, a secondary camera may be configured to capture the scene at the lower exposure time settings to detect banding. This reduces and/or eliminates a negative impact of banding on the preview from the primary camera, while allowing the image processor to analyze image data from the secondary camera, and in the event banding is detected, to then adjust the settings of the primary camera.

Figure 5:
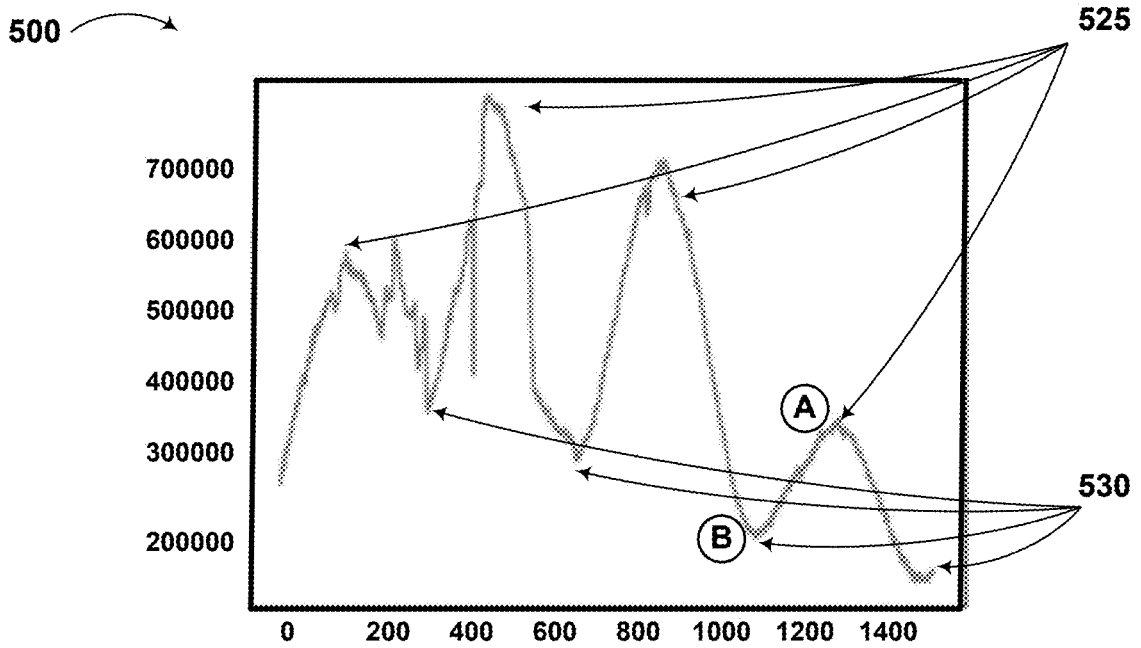
FIG. 5 is another example illustration of rolling band detection, in accordance with example embodiments.

FIG. 5 is another example illustration of rolling band detection, in accordance with example embodiments. A graphical representation 500 illustrates a relationship between brightness values (with values displayed along the vertical axis) and a location in a preview of a video (with values displayed along the horizontal axis). A preview (not shown in FIG. 5) may correspond to an exposure time setting of 2 ms. A number of peaks 525 indicate high brightness values corresponding to bright portions in the preview. Likewise, a number of troughs 530 indicate low brightness values corresponding to dark portions in the preview. A high occurrence of peaks and troughs in a graphical representation of a scene brightness values can indicate a presence of a rolling band. As illustrated, banding is much more clearly visible in the 2 ms exposure time flicker statistics.

A comparison of graphical representations 300, 400, and 500 indicates that an "average" of the rolling bands remain unchanged. This is because the total brightness values for the scene remain unchanged. However, the maximum amplitude of each of the bands is changed. For example, in graphical representation 500, a maximum value of brightness (e.g., at A) may be approximately 350,000 units (e.g., lumens), and a minimum value of brightness (e.g., at B) may be approximately 200,000 units, whereas an average value of brightness may be approximately 270,000 units. Note that the actual units used to measure brightness is not relevant; however the relative magnitudes of different regions is pertinent.

Also, for example, in graphical representation 400, maximum and minimum values of brightness (e.g., at C, D respectively) are lower than the values corresponding to A, B respectively in FIG. 5. However, the average value of brightness is approximately 270,000 units, same as that in FIG. 5.

In some embodiments, graphical representations 300, 400, and 500 may be determined based on a sensor row sum input. For example, the sensor row sum input may include aggregated light intensity data for two consecutive frames of a video. Generally, the aggregated light intensity data can be any type of statistical data (e.g., a mean, median, statistical distribution, etc.) that indicates row-wise light intensities. In some embodiments the aggregated light intensity data may include respective row-sums of pixel intensities in the two consecutive frames. For example, a sensor row sum is a technique used to measure an amount of light that is received by each row of pixels on an image sensor.

The image sensor (e.g., of the secondary camera) may include a plurality of light-sensing pixels that measure an intensity of light incident thereon and thereby collectively capture an image of an environment. The light-sensing pixels may be arranged in arrays, and may be grouped by position into pixel sensor groups. For example, an array of pixel sensors may be grouped into pixel sensor groups, where each pixel sensor group includes an array of pixel sensors. Such pixel sensor groups may be further grouped to define regions of interest (ROIs). Image processing circuitry groups may be configured to each receive pixel information from a corresponding pixel sensor group and further configured to perform image processing operations on the pixel information to provide processed pixel information during operation of the image sensor.

In the case of image processing, the input is typically either singular or a set of three channel images consisting of red, green, and blue (RGB) color channels. Such color images are commonly captured with an array of light sensors covered with different color filters, called a color filter array, which are generally arranged as a repeated mosaic. Examples of color filters can be, for example, a Bayer filter, a modified Bayer filter such as RGBE where a green filter is modified to an "emerald" filter, a red-yellow-yellow-blue (RYYB) filter, a cyan-yellow-yellow-magenta (CYYM) filter, a cyan-yellow-green-magenta (CYGM) filter, various modifications of the Bayer filter (e.g., RGBW where a green filter is modified to a "white" filter, a Quad Bayer filter (comprising 4× blue, 4× red, and 8× green filters), RYYB Quad Bayer (comprising 4× blue, 4× red, and 8× yellow filters), nonacell (comprising 9× blue, 9× red, and 18× green filters), RCCC filter (a monochrome sensor with a red channel to detect traffic lights, stop signs, etc.), RCCB filter (where the green pixels are clear), and others. For example, the color filter can also correspond to filters used in multi-spectral sensors. For low latency and memory bound applications it is sometimes desirable to process the raw color mosaic image as opposed to some RGB equivalent that was reconstructed from the raw image.

Some embodiments involve determining a pattern of light intensities for two consecutive frames of a video based on aggregated light intensity data (e.g., from the secondary camera). For example, the pattern of light intensities may be based on a difference between the respective row-wise sums of light intensities in the respective pixel arrays. For example, a first row-wise delta difference may be determined based on a difference between a first sum of pixel intensities in a first row of a first frame, and a second sum of pixel intensities in a first row of a second frame (e.g., successive to the first frame). Likewise, a second row-wise delta difference may be determined based on a difference between a third sum of pixel intensities in a second row of the first frame, and a fourth sum of pixel intensities in a second row of the second frame (e.g., successive to the first frame). Continuing thus, row-wise delta differences may be determined for each row of the pixel array.

In some embodiments, determining the pattern of light intensities may involve applying a Fourier transform (e.g., a fast Fourier transform (FFT)) to such row-wise delta differences over successive frames. This allows for an analysis of the aggregated light intensity data to a signal in a frequency domain. Generally speaking, in the event that the delta differences are substantially similar (e.g., the signal is substantially linear or flat), this is indicative of an absence of a rolling band. However, in the event the delta differences resolve into a curve (e.g., the signal is substantially sinusoidal), this may be indicative of a presence of a rolling band. In some embodiments, a rolling band may be identified through signal processing by comparing row sums in the two consecutive frames. For example, a pattern of light intensities for the two consecutive frames may be determined based on a difference between the respective row-wise sums of light intensities in the respective pixel arrays.

Generally, the pattern of light intensities may be used to determine a band frequency. For example, as described herein, a FFT may be applied to the delta differences between the respective row-wise sums of light intensities in the respective pixel arrays to obtain a signal in a frequency domain. Within the frequency domain, a frequency for the signal may be obtained to determine the band frequency, and a peak value may be used to determine a band amplitude.

Rolling Band Correction

Some embodiments involve determining the presence of a rolling band in the preview of the video, and adjusting an exposure time for the primary camera to reduce the rolling band in the preview of the video. In some embodiments, the adjusting of the exposure time involves determining whether to increase the exposure time for the image capturing device. Generally, an adjustment of the exposure time may be applied on a per frame basis during image capture (e.g., in near real-time).

Although existing approaches increase the exposure time upon detecting that there is a rolling band, such an automatic correction may not be desirable. For example, such an automatic correction may negatively impact a high dynamic range (HDR) of the video. An HDR display for an image can extend a range of user experience when viewing the image. For example, an image of a person in the dark may have a high composition of dark colors with a low luminance value. Likewise, an image of a sunlit sky may have a high composition of bright colors with a high luminance value. In some aspects, a ratio of respective luminance values may have a high dynamic range, for example, 1:1,000,000. Generally, the camera parameters may be adjusted to widen the exposure range to capture more detail in a scene (e.g., capturing details in both bright and dark areas). Increasing the exposure time can over-expose the brighter areas. Accordingly, in some embodiments, the determining of whether to increase the exposure time may be based on a determining of whether the increase of the exposure time reduces a dynamic range of the video. In some embodiments, upon a determination that the increase of the exposure time does not reduce the dynamic range of the video, a rolling band correction may be applied and the exposure time for the primary camera may be increased. Also, upon a determination that the increase of the exposure time reduces the dynamic range of the video, a rolling band correction may not be applied, and the exposure time for the primary camera may be maintained (e.g., not increased).

For example, the video may include objects of interest, regions of interest, and so forth. For example, one or more trained machine learning algorithms (e.g., an object detection algorithm, a face detection algorithm, a segmentation algorithm, and so forth) may be used to identify one or more regions of interest in the image. In some implementations, a user-approved facial recognition algorithm may be applied to identify one or more individuals in the image as likely objects of interest. For example, a user may enable access to a history of user preferences, and objects and/or individuals may be identified as being of high interest to the user. Accordingly, the determining of whether to increase the exposure time for the image capturing device may be based on a determining of whether the increase of the exposure time has a negative impact on the visibility and/or image characteristics of the objects of interest, regions of interest, and so forth. For example, increasing the exposure time may cause some of the objects and/or regions of interest to become bright enough to degrade their image quality. Similarly, decreasing the exposure time may cause some of the objects and/or regions of interest to become dark enough to degrade their image quality.

In some embodiments, the secondary camera may be maintained at an exposure time that does not exceed a time threshold. For example, the time threshold may be 3 ms, and the exposure time for the secondary camera may be maintained at or below 3 ms. As described with reference to FIG. 5, a lower exposure time may facilitate detection of rolling bands that may be otherwise not detectable at higher exposure time settings.

Rolling band detection and/or correction may be performed at various times (e.g., at periodic intervals) during video capture. For example, an ambient light measurement from the secondary camera may be analyzed at various times to determine whether there is a change in the amount of ambient light, and/or a change in an ambient light source (e.g., an addition or a removal of a light source). Also, for example, the camera system may determine whether such changes are caused by movement (e.g., device movement, scene change, etc.). In some embodiments, the camera system may determine whether the perceived change in a measurement of ambient light is caused by an environmental reflection of light from the device. Such and other considerations may be taken into account to determine whether a rolling band is present, and/or to mitigate for such presence.

Reliability of an ALS Sensor

Some devices may be equipped with a flicker sensor and/or an ambient light sensor (ALS) that may continuously or from time to time determine the ambient brightness of a scene that the camera can capture. In some devices, the ALS can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure time of an associated camera, or to help in this determination. Accordingly, it may be useful to determine whether data from the ALS is reliable.

Some embodiments involve receiving, from the ALS, sensor data indicative of ambient light. Such embodiments involve determining a first frequency of the ambient light based on the sensor data. For example, aggregated statistics related to brightness levels for pixels may be determined and an FFT approach may be applied to determine the first frequency of the ambient light. Such embodiments also involve determining a second frequency of the ambient light based on the pixel data from the image sensor of the secondary camera. For example, the pixel data from the secondary camera may be analyzed in a manner similar to the sensor data from the ALS to determine the second frequency of the ambient light. Assuming that the ALS and the secondary camera generally share similar fields of view, the first and second frequencies should be proximate to each other. Such embodiments further involve comparing the first frequency and the second frequency to determine whether there is a mismatch.

Some embodiments involve determining that there is a mismatch between the first frequency and the second frequency. For example, the comparison of the first frequency and the second frequency may indicate a perceptible difference in values. This can indicate an inaccuracy in the measurement of the ambient light. Such embodiments involve decreasing a confidence level of a measurement of the ambient light. In some embodiments, the image processing pipeline may be configured to use the confidence level of the measurement of the ambient light to determine whether to apply certain adjustments (e.g., brightness levels, exposure times, etc.).

Some embodiments involve determining that a mismatch between the first frequency and the second frequency exceeds a threshold mismatch value. For example, the comparison of the first frequency and the second frequency may indicate a significant difference in values. Generally, pixel data from the secondary camera may be more reliable than the sensor data from the ALS. Accordingly, in the event of a significant difference in values, this may indicate that the ALS may be malfunctioning. Such embodiments involve providing a notification that the ALS may have a potential malfunction.

Some embodiments involve determining that a mismatch between the first frequency and the second frequency is within a threshold mismatch value. For example, the comparison of the first frequency and the second frequency may indicate a negligible difference in values. This can indicate that the measurement of the ambient light is reliable. Such embodiments involve increasing a confidence level of a measurement of the ambient light.

Computing Device Architecture

Figure 6:
FIG. 6 is a block diagram of an example computing device, in accordance with example embodiments.
Figure 6:
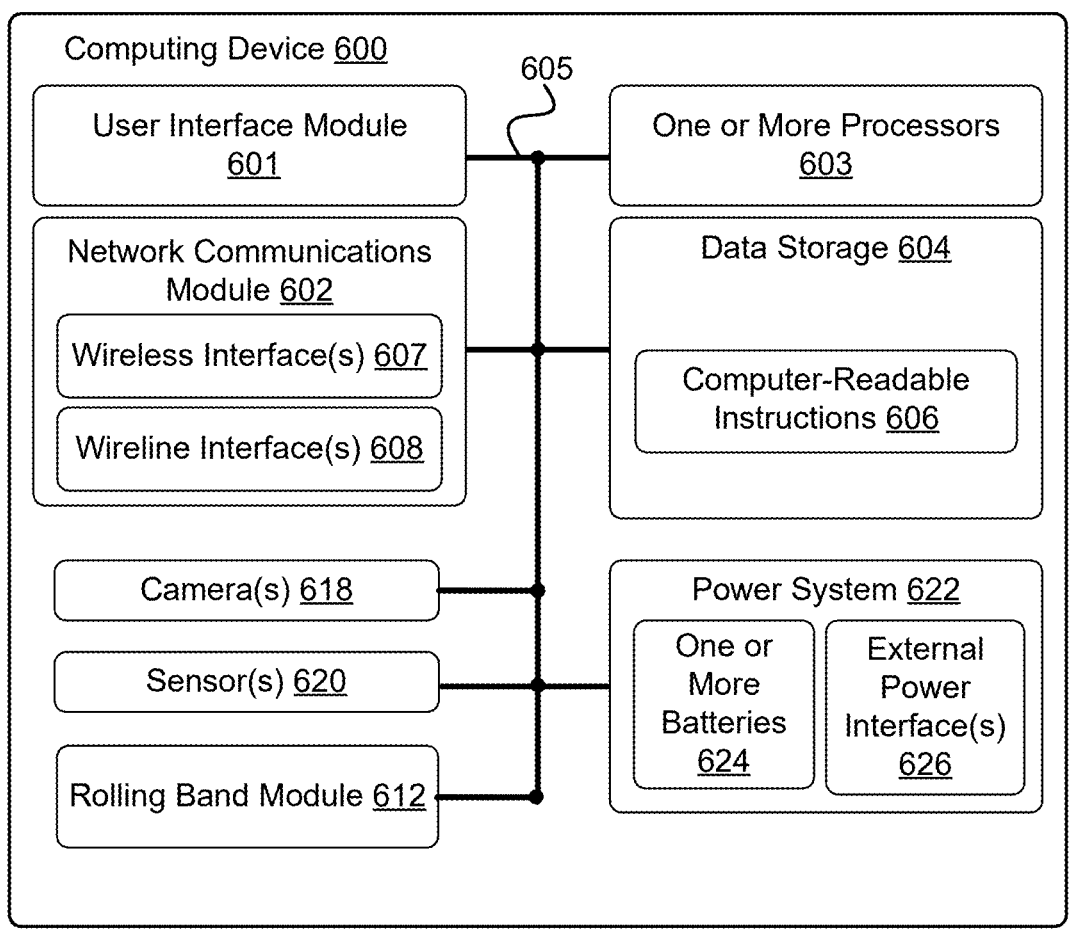

FIG. 6 is a block diagram of an example computing device 600, in accordance with example embodiments. In particular, computing device 600 shown in FIG. 6 can be configured to perform at least one function described herein, including method 700.

Computing device 600 may include a user interface module 601, a network communications module 602, one or more processors 603, data storage 604, one or more cameras 618, one or more sensors 620, and power system 622, all of which may be linked together via a system bus, network, or other connection mechanism 605.

User interface module 601 can be operable to send data to and/or receive data from external user input/output devices. For example, user interface module 601 can be configured to send and/or receive data to and/or from user input devices such as a touch screen, a computer mouse, a keyboard, a keypad, a touch pad, a trackball, a joystick, a voice recognition module, and/or other similar devices. User interface module 601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 601 can also be configured to generate audible outputs, with devices such as a speaker, speaker jack, audio output port, audio output device, earphones, and/or other similar devices. User interface module 601 can further be configured with one or more haptic devices that can generate haptic outputs, such as vibrations and/or other outputs detectable by touch and/or physical contact with computing device 600. In some examples, user interface module 601 can be used to provide a graphical user interface (GUI) for utilizing computing device 600.

Network communications module 602 can include one or more devices that provide one or more wireless interfaces 607 and/or one or more wireline interfaces 608 that are configurable to communicate via a network. Wireless interface(s) 607 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 602 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 603 can include one or more general purpose processors (e.g., central processing unit (CPU), etc.), and/or one or more special purpose processors (e.g., digital signal processors, tensor processing units (TPUs), graphics processing units (GPUs), application specific integrated circuits, etc.). One or more processors 603 can be configured to execute computer-readable instructions 606 that are contained in data storage 604 and/or other instructions as described herein.

Data storage 604 can include one or more non-transitory computer-readable storage media that can be read and/or accessed by at least one of one or more processors 603. The one or more computer-readable storage media can include volatile and/or non-volatile storage components, such as optical, magnetic, organic or other memory or disc storage, which can be integrated in whole or in part with at least one of one or more processors 603. In some examples, data storage 604 can be implemented using a single physical device (e.g., one optical, magnetic, organic or other memory or disc storage unit), while in other examples, data storage 604 can be implemented using two or more physical devices.

Data storage 604 can include computer-readable instructions 606 and perhaps additional data. In some examples, data storage 604 can include storage required to perform at least part of the herein-described methods, scenarios, and techniques and/or at least part of the functionality of the herein-described devices and networks. In particular, computer-readable instructions 606 can include instructions that, when executed by processor(s) 603, enable computing device 600 to provide for some or all of the functionality described herein.

In some embodiments, computer-readable instructions 606 can include instructions that, when executed by processor(s) 603, enable computing device 600 to carry out operations. The operations may include displaying, by a viewfinder, a preview of a video of a scene being captured by a primary camera. The operations may also include receiving, from an image sensor of a secondary camera, pixel data corresponding to the scene, wherein the primary camera and the secondary camera share a common field of view. The operations may further include determining, based on the pixel data from the secondary camera, a presence or an absence of a rolling band in the preview of the video being captured by the primary camera.

In some examples, computing device 600 can include rolling band module 612. Rolling band module 612 can be configured to detect and/or correct a rolling band in a video. For example, rolling band module 612 can be configured to correlate a pattern of light intensities (e.g., based on image data from a secondary camera of the one or more cameras 618) and an amount of flicker (e.g., based on image data from a secondary camera) to determine a presence or an absence of a rolling band in the video.

In some examples, computing device 600 can include one or more cameras 618. Camera(s) 618 can include one or more image capture devices, such as still and/or video cameras, equipped to capture light and record the captured light in one or more images; that is, camera(s) 618 can generate image(s) of captured light. The one or more images can be one or more still images and/or one or more images utilized in video imagery. Camera(s) 618 can capture light and/or electromagnetic radiation emitted as visible light, infrared radiation, ultraviolet light, and/or as one or more other frequencies of light. Camera(s) 618 can include a wide camera, a tele camera, an ultrawide camera, and so forth. Also, for example, camera(s) 618 can be front-facing or rear-facing cameras with reference to computing device 600. Camera(s) 618 can include camera components such as, but are not limited to, an aperture, shutter, recording surface (e.g., photographic film and/or an image sensor), lens, and/or shutter button. The camera components may be controlled at least in part by software executed by one or more processors 603. For illustrative purposes, one camera of the one or more cameras 618 may be a primary camera that is capturing a video of a scene, and a second camera of the one or more cameras 618 may be a secondary camera used for detection of rolling bands. Generally, the secondary camera may be viewing the same scene as that being captured by the primary camera. In some embodiments, a field of view of the secondary camera may be wider than a field of view of the primary camera. This can enable the secondary camera to detect ambient light sources that may not be within the field of view of the primary camera.

In some examples, computing device 600 can include one or more sensors 620. Sensors 620 can be configured to measure conditions within computing device 600 and/or conditions in an environment of computing device 600 and provide data about these conditions. For example, sensors 620 can include one or more of: (i) sensors for obtaining data about computing device 600, such as, but not limited to, a thermometer for measuring a temperature of computing device 600, a battery sensor for measuring power of one or more batteries of power system 622, and/or other sensors measuring conditions of computing device 600; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 600, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 600, such as, but not limited to, an infrared sensor, an optical sensor, a light sensor (e.g., an ambient light sensor), a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 620 are possible as well.

Power system 622 can include one or more batteries 624 and/or one or more external power interfaces 626 for providing electrical power to computing device 600. Each battery of the one or more batteries 624 can, when electrically coupled to the computing device 600, act as a source of stored electrical power for computing device 600. One or more batteries 624 of power system 622 can be configured to be portable. Some or all of one or more batteries 624 can be readily removable from computing device 600. In other examples, some or all of one or more batteries 624 can be internal to computing device 600, and so may not be readily removable from computing device 600. Some or all of one or more batteries 624 can be rechargeable. For example, a rechargeable battery can be recharged via a wired connection between the battery and another power supply, such as by one or more power supplies that are external to computing device 600 and connected to computing device 600 via the one or more external power interfaces. In other examples, some or all of one or more batteries 624 can be non-rechargeable batteries.

One or more external power interfaces 626 of power system 622 can include one or more wired-power interfaces, such as a USB cable and/or a power cord, that enable wired electrical power connections to one or more power supplies that are external to computing device 600. One or more external power interfaces 626 can include one or more wireless power interfaces, such as a Qi wireless charger, that enable wireless electrical power connections, such as via a Qi wireless charger, to one or more external power supplies.

Once an electrical power connection is established to an external power source using one or more external power interfaces 626, computing device 600 can draw electrical power from the external power source the established electrical power connection. In some examples, power system 622 can include related sensors, such as battery sensors associated with the one or more batteries or other types of electrical power sensors.

One or more external power interfaces 626 of power system 622 can include one or more wired-power interfaces, such as a USB cable and/or a power cord, that enable wired electrical power connections to one or more power supplies that are external to computing device 600. One or more external power interfaces 626 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 626, computing device 600 can draw electrical power from the external power source the established electrical power connection. In some examples, power system 622 can include related sensors, such as battery sensors associated with the one or more batteries or other types of electrical power sensors.

Example Methods of Operation

FIG. 7 is a flowchart of a method, in accordance with example embodiments. Method 700 may include various blocks or steps. The blocks or steps may be carried out individually or in combination. The blocks or steps may be carried out in any order and/or in series or in parallel. Further, blocks or steps may be omitted or added to method 700.

The blocks of method 700 may be carried out by various elements of computing device 600 as illustrated and described in reference to FIG. 6.

Block 710 involves displaying, by a viewfinder, a preview of a video of a scene being captured by a primary camera.

Block 720 involves receiving, from an image sensor of a secondary camera, pixel data corresponding to the scene, wherein the primary camera and the secondary camera share a common field of view.

Block 730 involves determining, based on the pixel data from the secondary camera, a presence or an absence of a rolling band in the preview of the video being captured by the primary camera.

Some embodiments involve determining the presence of a rolling band in the preview of the video. Such embodiments involve adjusting an exposure time for the primary camera to reduce the rolling band in the preview of the video.

In some embodiments the adjusting of the exposure time involves determining whether to increase the exposure time for the primary camera.

In some embodiments the determining of whether to increase the exposure time may be based on a determining of whether the increase of the exposure time reduces a dynamic range of the video.

Some embodiments involve, upon a determination that the increase of the exposure time reduces the dynamic range of the video, maintaining the exposure time for the primary camera.

Some embodiments involve, upon a determination that the increase of the exposure time does not reduce the dynamic range of the video, increasing the exposure time for the primary camera.

In some embodiments the secondary camera may be maintained at an exposure time that does not exceed a time threshold.

Some embodiments involve receiving, from an ambient light sensor (ALS), sensor data indicative of ambient light. Such embodiments involve determining a first frequency of the ambient light based on the sensor data. Such embodiments also involve determining a second frequency of the ambient light based on the pixel data from the image sensor of the secondary camera. Such embodiments further involve comparing the first frequency and the second frequency to determine whether there is a mismatch.

Some embodiments involve determining that there is a mismatch between the first frequency and the second frequency. Such embodiments involve decreasing a confidence level of a measurement of the ambient light.

Some embodiments involve determining that a mismatch between the first frequency and the second frequency is within a threshold mismatch value. Such embodiments involve increasing a confidence level of a measurement of the ambient light.

Some embodiments involve determining that a mismatch between the first frequency and the second frequency exceeds a threshold mismatch value. Such embodiments involve providing a notification that the ALS may have a potential malfunction.

In some embodiments involve the primary camera and the secondary camera may be components of a mobile device.

In some embodiments, the primary camera and the secondary camera may be located on a same side of the mobile device.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods. Thus, the computer readable media may include secondary or persistent long-term storage, like read only memory (ROM), optical or magnetic disks, compact disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A computer-implemented method, comprising:
displaying, by a viewfinder, a preview of a video of a scene being captured by a primary camera;
receiving, from an image sensor of a secondary camera, pixel data corresponding to the scene, wherein the primary camera and the secondary camera share a common field of view; and
determining, based on the pixel data from the secondary camera, a presence or an absence of a rolling band in the preview of the video being captured by the primary camera, the method further comprising:
receiving, from an ambient light sensor (ALS), sensor data indicative of an ambient light,
determining a first frequency of the ambient light based on the sensor data,
determining a second frequency of the ambient light based on the pixel data from the image sensor of the secondary camera, and
comparing the first frequency and the second frequency to determine whether there is a mismatch.

2. The computer-implemented method of claim 1, further comprising:
determining the presence of the rolling band in the preview of the video; and
adjusting an exposure time for the primary camera to reduce the rolling band in the preview of the video.

3. The computer-implemented method of claim 1, wherein the adjusting of the exposure time comprises:
determining whether to increase the exposure time for the primary camera.

4. The computer-implemented method of claim 3, wherein the determining of whether to increase the exposure time is based on a determination of whether the increase of the exposure time reduces a dynamic range of the video.

5. The computer-implemented method of claim 4, further comprising:
upon a determination that the increase of the exposure time reduces the dynamic range of the video, maintaining the exposure time for the primary camera.

6. The computer-implemented method of claim 4, further comprising:
upon a determination that the increase of the exposure time does not reduce the dynamic range of the video, increasing the exposure time for the primary camera.

7. The computer-implemented method of claim 1, wherein the secondary camera is maintained at an exposure time that does not exceed a time threshold.

8. The computer-implemented method of claim 1, further comprising:
determining that there is a mismatch between the first frequency and the second frequency; and
decreasing a confidence level of a measurement of the ambient light.

9. The computer-implemented method of claim 1, further comprising:
determining that a mismatch between the first frequency and the second frequency is within a threshold mismatch value; and
increasing a confidence level of a measurement of the ambient light.

10. The computer-implemented method of claim 1, further comprising:

determining that a mismatch between the first frequency and the second frequency exceeds a threshold mismatch value; and providing a notification that the ALS may have a potential malfunction.

11. The computer-implemented method of claim 1, wherein the primary camera and the secondary camera are components of a mobile device.

12. The computer-implemented method of claim 11, wherein the primary camera and the secondary camera are located on a same side of the mobile device.

13. A computing device, comprising:

a primary camera and a secondary camera that share a common field of view;

one or more processors; and data storage, wherein the data storage has stored thereon computer-executable instructions that, when executed by the one or more processors, cause the computing device to carry out functions comprising:

displaying, by a viewfinder of the computing device, a preview of a video of a scene being captured by the primary camera;

receiving, from an image sensor of the secondary camera, pixel data corresponding to the scene; and determining, based on the pixel data from the secondary camera, a presence or an absence of a rolling band in the preview of the video being captured by the primary camera, and the functions further comprising:

receiving, from an ambient light sensor (ALS), sensor data indicative of an ambient light, determining a first frequency of the ambient light based on the sensor data, determining a second frequency of the ambient light based on the pixel data from the image sensor of the secondary camera, and comparing the first frequency and the second frequency to determine whether there is a mismatch.

14. The computing device of claim 13, wherein the functions comprise:

determining the presence of the rolling band in the preview of the video; and adjusting an exposure time for the primary camera to reduce the rolling band in the preview of the video.

15. The computing device of claim 14, wherein the adjusting of the exposure time is based on a determination of whether an increase of the exposure time reduces a dynamic range of the video.

16. The computing device of claim 13, wherein the secondary camera is maintained at an exposure time that does not exceed a time threshold.

17. The computing device of claim 13, wherein the primary camera and the secondary camera are located on a same side of the computing device.

18. The computing device of claim 13, wherein the functions comprise:

determining that there is a mismatch between the first frequency and the second frequency; and decreasing a confidence level of a measurement of the ambient light.

19. The computing device of claim 13, wherein the functions comprise:

determining that a mismatch between the first frequency and the second frequency is within a threshold mismatch value; and increasing a confidence level of a measurement of the ambient light.

20. The computing device of claim 18, wherein the functions comprise:

determining that a mismatch between the first frequency and the second frequency exceeds a threshold mismatch value; and providing a notification that the ALS may have a potential malfunction.

21. An article of manufacture comprising one or more non-transitory computer readable media having computer-readable instructions stored thereon that, when executed by one or more processors of a computing device, cause the computing device to carry out functions comprising:

displaying, by a viewfinder, a preview of a video of a scene being captured by a primary camera;

receiving, from an image sensor of a secondary camera, pixel data corresponding to the scene, wherein the primary camera and the secondary camera share a common field of view; and determining, based on the pixel data from the secondary camera, a presence or an absence of a rolling band in the preview of the video being captured by the primary camera, and the functions further comprising:

receiving, from an ambient light sensor (ALS), sensor data indicative of an ambient light, determining a first frequency of the ambient light based on the sensor data, determining a second frequency of the ambient light based on the pixel data from the image sensor of the secondary camera, and comparing the first frequency and the second frequency to determine whether there is a mismatch.

* * * * *